United States Patent [19]

Kesting

[11] 3,945,926

[45] Mar. 23, 1976

[54] INTEGRAL MICROPOROUS HIGH VOID VOLUME POLYCARBONATE MEMBRANES AND A DRY PROCESS FOR FORMING SAME

[75] Inventor: Robert E. Kesting, Irvine, Calif.

[73] Assignee: Chemical Systems, Inc., Santa Ana, Calif.

[22] Filed: Oct. 2, 1972

[21] Appl. No.: 293,943

Related U.S. Application Data

[63] Continuation-in-part of Ser. No. 190,415, Oct. 18, 1971, abandoned.

[52] U.S. Cl. .............................. 210/500 M; 264/41
[51] Int. Cl.² ....................................... B01D 31/00
[58] Field of Search ......... 260/2.5 M; 210/500, 490, 210/507, 321, 23; 55/16, 158; 23/258.5; 264/41, 49; 204/296

[56] References Cited
UNITED STATES PATENTS

| | | | |
|---|---|---|---|
| 3,615,024 | 10/1971 | Michaels | 210/500 X |
| 3,653,180 | 4/1972 | Juliano et al. | 55/16 |
| 3,762,136 | 10/1973 | Kimura | 55/158 |
| 3,812,224 | 5/1974 | Smith et al. | 260/2.5 M |

*Primary Examiner*—Frank A. Spear, Jr.
*Attorney, Agent, or Firm*—Knobbe, Martens, Olson, Hubbard & Bear

[57] ABSTRACT

Integral, skinned and unskinned, microporous microfiltration and ultrafiltration, electrophoresis membranes having high void volumes (above 50% void) composed of polycarbonates and copolymers of polycarbonates with polyalkylene oxides and the dry process for producing such membranes are disclosed.

23 Claims, No Drawings

INTEGRAL MICROPOROUS HIGH VOID VOLUME POLYCARBONATE MEMBRANES AND A DRY PROCESS FOR FORMING SAME

RELATED APPLICATIONS

This application is a continuation-in-part of copending application Ser. No. 190,415, filed Oct. 18, 1971 entitled INTEGRAL (UNSKINNED) HIGH VOID VOLUME POLYCARBONATE MEMBRANES AND A DRY PROCESS FOR FORMING SAME now abandoned.

This invention relates to polycarbonate resins and membranes and methods for producing same. More specifically, this invention relates to a highly specific molecular weight range of polycarbonate polymers and copolymers which have unique and unexpected properties, and to integral, microporous, high void volume membranes composed of such polymers and copolymers as well as to techniques and methods of manufacture of such membranes by a dry process.

DEFINITIONS

1. Integral — Continuous uniform structure of small open-celled [0.1 to 2.0 micrometer ($\mu$m)] voids without occasional larger voids greater than about 5.0$\mu$m.

2. Unskinned — Not possessing a dense (nonporous) skin layer. Unskinned membranes have a matte finish on both top and bottom surfaces.

3. Skinned — Skinned membranes possess one glossy and one matte surface.

4. High void volume — Void volume (i.e., that portion of the membrane composed of voids or holes) above 50%, preferably above 65%, and optimally between 70 and 85%.

5. Dry process — The method of preparing membranes, films, synthetic leathers, etc., that starts with a polymer solution which is cast and then allowed to evaporate completely (i.e., dry = complete evaporation). Dry processes employ dilute and therefore, relatively fluid (non-viscous) polymer solutions.

6. Wet process — The method of preparing membranes, films, synthetic leathers, etc., which starts with a polymer solution that is cast and then only allowed to evaporate partially after which the solution is immersed in a nonsolvent gelation bath where the remainder of the solvent is exchanged for nonsolvent (i.e., wet = combined evaporation-diffusion). Wet processes employ concentrated and, therefore, relatively viscous polymer solutions.

7. Molecular weight MW = generally the weight of 1 molecule of a substance expressed as a multiple of the weight of a hydrogen atom which is taken as unity. MW ranges are an important part of this patent and are expressed in two ways in every instance. The first way is the intrinsic viscosity or [$\eta$]. [$\eta$] is easily determined by viscosity measurements and does not depend on the validity of the particular viscosity-molecular weight relationship. In this patent [$\eta$] has the dimension of milliliters/gram (ml/g) rather than the units deciliters/gram (dl/g) which are more common in the American polymer literature. (Ml/g − 100 = dl/g).

$$[\eta] = \lim_{c \to 0} \eta sp/c$$

versus $c$ where $$\eta sp = \frac{t-t_o}{t_o}$$

and $t$ = time required for a dilute polymer solution to flow through a capillary, $t_0$ = time required for the solvent to flow through the same capillary, and $c$ = polymer concentration in g/ml. All values cited in this patent were determined at 25°C in methylene chloride. The following viscosity MW relationship is used to get approximate MW values: $[\eta]=KM^\alpha$ where $K=1.11\times10^{-2}$ and $\alpha=0.82$ from Ref. 8 on p. 185 of "Chemistry and Physics of Polycarbonates" by Hermann Schnell, Interscience, New York, 1964. [MW values are only approximate because the equation was derived for methylene chloride solutions at 20°C (*not* 25°C) and for bisphenol-A BPA polycarbonate homopolymers (*not* copolymers).]

8. Self supporting or unsupported — The condition in which a membrane has sufficient strength of its own as not to need reinforcing by fibers imbedded in its matrix.

9. Polycarbonate resins — Polymers and copolymers containing characteristic polycarbonate linkages between organic radicals of the type described and exemplified herein (and their chemical equivalents, i.e. substituted derivatives wherein the substituent(s) does not significantly alter the polymer forming characteristics of the radicals) and specifically includes both polycarbonate homopolymers and copolymers of the type described and exemplified herein.

10. Microfiltration — the pressure driven membrane separation process which utilizes membranes whose pores are arbitrarily no smaller than about 0.05 $\mu$m in diameter.

11. Ultrafiltration — the pressure driven membrane separation process which utilizes membranes whose pores are arbitrarily between about 30 A and about 0.05 $\mu$m in diameter.

BACKGROUND

Early work on polycarbonates was done by Carrothers and Van Nata, III GLYCOL ESTERS OF CARBONIC ACID, Journal of the American Chemical Society, Vol. 52, 314–26 (1930), HIGH POLYMERS Vol. 1, Collected Papers of Wallace H. Carrothers on Polymerization, Interscience Publishers, Inc., 1940, 29–42. It was not until about 1960, however, that polycarbonate resins became available in commercial quantities.

Polycarbonates are members of the larger class of polymers known as polyesters. Commercial polycarbonates are generally polymeric combinations of bisphenols (bi-functional phenols) linked together through carbonate linkages. They are manufactured by ester exchange between a diphenyl carbonate and a dihydroxy aromatic compound, or by phosgenation of a dihydroxy aromatics. The base polymer made from bisphenol A has the following structure:

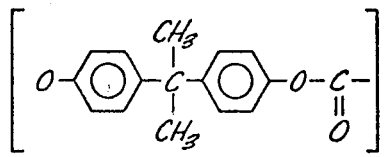

Industrial polycarbonates are produced in the United States by General Electric Company and sold under the trade name Lexan, by Mobay Chemical Company and sold under the trade name Merlon, in Germany by Farben Fabriken Bayer AG and sold under the trade name Makrolon, and in Japan by Mitsubishi Edogawa Chemical Company and sold under the trade name Jupilon, and by Idemitsu Kosan Company, Ltd. and Teijin Chemical Company, Ltd. and sold under the trade name Panlite. The common commercially available polycarbonates generally have molecular weight ranging up to about 35,000. Polycarbonate technology generally is quite well developed and reference may be made to texts and too the chemical literature generally for polycarbonate technology details.

Copolymers of polycarbonates and polyalkylene oxides have also been reported, see Eugene P. Goldberg, ELASTOMERIC POLYCARBONATE BLOCK COPOLYMERS, Journal of Polymer Science: Part C, No. 4, pp. 707–730 (1964) and French Pat. No. 1,198,715, Eugene Paul Goldberg, publication date Dec. 9, 1959. Goldberg reported the formation of elastomeric polycarbonate block copolymers formed by copolymerization of bisphenol A with poly(oxyethylene), poly(oxyethylene-oxypropylene), poly(oxypropylene), and poly(oxybutylene) glycols. The copolymerization was carried out by the reaction of bisphenol A and the polyalkylene glycol with phosgene in pyridine solution.

Some of the propertiess of the polycarbonate copolymers are reported by Goldberg, but integral, microporous, high void volume membranes for microfiltration and ulrafiltraton, electrophoresis were not previously known and none are suggested by Goldberg.

Polycarbonate membranes, made by a wet process from commercially available polycarbonates, i.e., General Electric Lexan polycarbonates, have been described, Alan Sherman Michaels, South African Pat. No. 68/5860, U.S. Pat. No. 3,526,588.

Asymmetric (i.e., skinned) membranes of the copolycarbonates of bisphenol-A and polyethylene oxides prepared by a wet process were reported earlier by R. E. Kesting, the present inventor.

1. R. E. Kesting, paper presented at Cal Tech Symposium on Biomedical Polymers, July 8, 1969;
2. R. E. Kesting, J. Macromol Sci. (Chem.), A (3), 655, (1970); and
3. R. E. Kesting, Chapter in Biomedical Polymers, ed. by Rembaum and Shen, Marcel Dekker, Inc., New York, 1971 (for dialysis applications).

These membranes, however, were low void volume membranes, i.e. below 50% void volume, or weak, non-integral membranes. A good general reference on membranes is R. E. Kesting, SYNTHETIC POLYMERIC MEMBRANES, McGraw-Hill, 1971, which is incorporated herein by reference.

It has been speculated that polycarbonates are suitable generally as membrane formers. For example, Murata (U.S. Pat. No. 3,450,650) and Seiner (U.S. Pat. No. 3,655,591) speculate that polycarbonates can be made into membranes. Murata, whose basic process is disclosed in U.S. Pat. No. 3,031,328, makes a general speculation concerning many polymers including the polycarbonates. However, I have shown that commercially available polycarbonates are not of sufficiently high MW or solubility to be made into integral high void volume, membranes of great strength and uniformity. Using the procedure referred to by Murata, only non-integral (i.e., lacy) "membranes" with large irregularities, or at best membranes fraught with orange peel imperfections can be produced. Such "membranes" are not of commercial or other practical interest. Seiner's speculation is insufficient to permit evaluation.

As yet, neither skinned or skinned membranes of this type nor any dry process for forming any polycarbonate membranes has been reported, and, until the present invention, unsupported, integral microporous high void volume microfiltration, ultrafiltration and electrophoresis membranes manufactured by a dry (essentially complete evaporation) process and possessing the advantages of the physical and chemical properties of the polycarbonates and polycarbonate copolymers have eluded workers in this field. A principal feature of this advantage is that such integral high void volume membranes having great and unexpected advantages over other membranes can now be produced using the methods, techniques and materials of this invention as set forth hereinafter.

Polycarbonate membranes produced according to this invention are exceptionally tough. The membranes exhibit a heretofore unattainable degree of integrity with high void volumes, i.e., above 50% void, preferably over 65%, ideally 70–85%. The physical properties, such as strength, stability, etc. of the polycarbonates and polycarbonate copolymers combined with the temperature stability and chemical properties of polycarbonates result in membranes produced according to this invention which are far superior in most respects to membranes produced with other materials and using other techniques.

Among the features of the invention which distinguish it from the prior art is the high void volume attainable with the materials and techniques of this invention, coupled with membrane integrity.

The term "void volume" as used herein refers to that portion of the membranes which is occupied by space, i.e. the open or empty portions of the membrane. The term "high void volume" as used herein means membranes having void volumes of greater than 50%, ranging generally in the range of from about 65% to about 85% and preferably in the range of from about 70% to about 85% void volume. A membrane is regarded as an integral membrane, or one having a high integrity, when the membrane is self supporting in one piece with no macroscopically observable discontinuities and having a generally homogeneous structure along any plane taken parallel to the surface of the membrane. (See also under definitions)

Another characteristic which distinguishes some membranes of the present invention from those of the prior art is the absence of a skin. Unskinned membranes are recognizable by their matte finishes on both top and bottom surfaces. Both surfaces are matte because they have a high density of pores in the micrometer ($\mu$m) size range. Such porous surfaces do not reflect light as efficiently as dense films or skinned membranes, both of which have a glossy finish.

The unskinned membranes, which are an important facet of the invention, are useful as microfiltration membranes, i.e. in separation processes in which pressure is employed as the driving force such that particulate matter larger than the size of the pores of the membrane cannot penetrate the membrane. Selective separation on the basis of particle size is accomplished using these microfiltration membranes.

The process of this inventon is also useful in making high quality, high void volume, microporous integral skinned membranes and, in its broader aspects, this invention contemplates and includes such membranes.

The membranes described herein are useful as microfiltration and ultrafiltration membranes and also as electrophoresis membranes, i.e. membranes used to contain charged (usually proteinaceous) materials in such a manner as to minimize thermal diffusion while the materials move along the membrane as a result of applied electromotive force and the passage of electrical current.

The membranes of this invention consist essentially of polycarbonate resins selected from the group consisting of

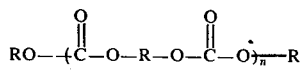

and

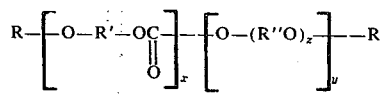

wherein $n$ is an integer greater than about 180 and less than about 600, $x$ is an integer greater than about 180 and less than 600, $y$ approximates unity where $z=80$ and approximates 6 where $z=13$ (for the case where $x+z=180$), and the sum of $x$ and $y$ is an integer greater than about 180 and less than about 600, $z$ is an integer of from about 13 to about 450, R is a radical selected from the group consisting of

and

R' is a radical from the group consisting of

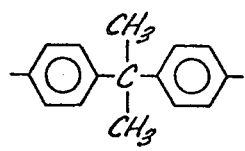

and

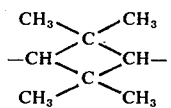

or substituted derivatives thereof and wherein R'' is a radical selected from the group consisting of

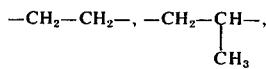

and

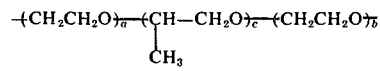

wherein $a$ and $b$ are integers ranging from about 3 to about 10 and $c$ is an integer ranging from about 20 to about 50.

Reference to the compound

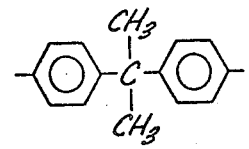

and

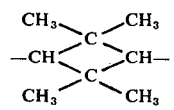

in this specification and in the claims includes substituted derivatives thereof, such as

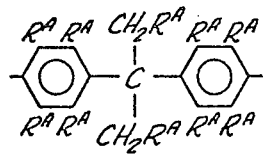

and

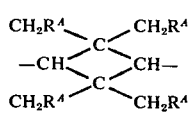

wherein one or more of the substituents $R^4$ may be hydrogen, substituted or unsubstituted lower (1–9 carbon) alkyl, aryl, lower (1–9 carbon) aralkyl, halogen, nitro, alkoxy or other substituents which do not significantly alter the essential polymer forming and polymer-influencing characteristics of the radical.

The polymers are produced, preferably, by the reaction of bisphenol A or 2,4 tetramethylcyclobutanediol or other appropriate equivalent bisphenols or diols with phosgene in pyridine solution to form homopolymers having molecular weights greater than about 46,000 ($[\eta]=75$) or by reacting bisphenol A or 2,4 tetramethylcyclobutanediol and a selected polyalkylene glycol with phosgene in pyridine solution.

Common commercially available polycarbonates, which have molecular weights in the range up to about 35,000 are unsatisfactory and do not form the high void volume microporous integral membranes of this invention (when the dry process is used in their manufacture). Because the dry (essentially complete evaporation) process employs dilute solutions of polymer, polymer MW must be higher than for wet processes which employ concentrated solutions in order to ensure integrity. It is, accordingly, necessary to use polycarbonates and polycarbonate copolymers having molecular weights of at least about 46,000 ($[\eta]=75$) and preferably in the range of from about 70,000 ($[\eta]=100$) to 145,000 ($[\eta]=190$), optimum molecular weight being in the range of from about 110,000 $[\eta]=150$ to about 130,000 $[\eta]=175$.

The membranes formed according to this invention have many unique and highly advantageous properties, especially as compared with presently commercially available membranes. The membranes of this invention can be autoclaved at substantially higher temperatures than cellulosic membranes and heat sealed. These membranes are highly resistant to hydrolysis, (and can be made more so both by varying R'–R'' and by utilizing thiophosgene instead of phosgene) and are very much stronger than known membranes and are non-friable. These membranes are flexible, both wet and dry, do not change dimensions significantly between the wet and dry conditions, and retain their flexibility over a broad range of temperatures. Indeed, the membranes are self supporting, flexible, and retain high strength even at liquid nitrogen temperatures. This broad range of high flexibility coupled with high dimensional stability, with little change from dry dimensions to wet dimensions, thereby obviates many of the difficult problems which have faced workers using ultra-filtration and electrophoresis membranes in the past.

These and other important features and advantages of the polymers, films, membranes, methods and techniques of this invention will be discussed and will be apparent from the detailed discussion which follows.

Currently available membranes are prepared from a number of different polymers, by far the most important of which are the nitrate and acetate esters of cellulose or blends of cellulose nitrate and cellulose acetate. These membranes are prepared by the phase inversion process, described in detail hereinafter.

The advantage of the cellulose nitrate and cellulose acetate membranes is that they can be prepared in a wide range of pore sizes with a narrow pore size distribution. Their disadvantages include the fact that they are prepared from a natural product starting material, cellulose, which varies rather significantly from batch to batch with the source, climatic conditions, impurities, handling, etc. In addition, the degree of substitution (which can vary from 0 for the unsubstituted cellulose to 3 for the trisubstituted derivative) can likewise vary from batch to batch with observable effects upon processing and end use characteristics. A further disadvantage of the cellulosics for electrophoretic applications is the presence of charged groups such as sulfate or carboxyl. Such groups contribute to electroosmosis which can be a detrimental. Polycarbonates do not have such charged groups.

The polycarbonates, on the other hand, have outstanding physical properties such as tensile and structural strength. Because they are not friable, as are the cellulosics when in an ultrafiltration or electrophoresis membrane form, they are more "forgiving" during handling. Furthermore, their extreme toughness and lack of brittleness makes it possible to prepare useful continuous tapes or rolls of these materials and allows folding and creasing without cracking.

The polycarbonates are more resistant to hydrolysis than the cellulosics and can be made orders of magnitude more resistant to hydrolysis. They are much less biodegradable than the cellulosics and have less tendency to sorb proteins and, therefore, have less tendency to become blocked by proteinaceous slime. The polycarbonates are also heat sealable and autoclavable, retain their flexibility even at cryogenic temperatures and, because of their great strength, do not require reinforcement with fibers, etc., which make fabrication exceedingly difficult and significantly alter the characteristics of the end product membranes.

PROBLEMS ENCOUNTERED

Having decided to attempt to fabricate integral unskinned high void volume microfiltration, ultrafiltration and electrophoresis membranes from polycarbonates by a dry process, the first step was to test the suitability of commercially available polycarbonates, such as Lexan, Merlon, etc. After a great deal of experimentation, it was determined that the molecular weights of the commercially available polycarbonates were too low to produce microporous, unsupported, integral, high void volume microfiltration, ultrafiltraton and electrophoresis membranes by a dry process. The fact that the molecular weight of the polymer had to be very high, substantially higher than the molecular weight of available polycarbonates, before a microporous integral high void volume microfiltration, ultrafiltration or electrophoresis membrane could be prepared by a dry process was a new and quite unexpected discovery. Previous experience taught that once a membrane polymer was above a certain molecular weight, usually around 25,000 to 35,000 for cellulose acetate and cellulose nitrate, further increases in molecular weight are unimportant. In this case, polycarbonates of molecular weight 25,000 to 35,000, the large volume commercial types such as Lexan, are completely unsuitable for the preparation of integral dry process high void volume microfiltraton, ultrafiltration and electrophoresis membranes by a dry process. It was discovered that the molecular weight of polycarbonates has to be in excess of about 46,000 $[\eta]=75$ before such membranes can be made by a dry process. No such polycarbonates are currently available in this country although high molecular weight polycarbonate homopolymers have been produced on a limited basis in other countries. No such high molecular weight polycarbonate copolymers are available from any known source and, as previously pointed out, the importance of the molecular weight in the formation of high void volume membranes of the type under consideration was not previously recognized.

While membranes can be formed from high molecular weight polycarbonate homopolymers, such polycarbonates have such low solubility in multi-component casting solutions as to make membrane production exceedingly difficult.

Membranes produced from the high molecular weight polycarbonate homopolymers differ in structure from those found to be optimal as electrophoresis membranes. Such membranes, although less suitable for electrophoresis have a fibrous mat structure which is acceptable for microfiltration.

Block copolymers of two homopolymers are more soluble than either homopolymer in a solvent system which is capable of dissolving all three polymers individually. It was found that the addition of a small amount of polyethylene oxide in the polymer structure increased the polycarbonate solubility in casting solutions.

It was also thought desirable to match the hydrophilic/hydrophobic balance of cellulose acetate with a degree of substitution of about 2.5. The bisphenol A- polycarbonate homopolymer is considerably more hydrophobic than cellulose acetate and tends to dry out too quickly. Polyalkylene oxides, polyethylene oxide for example, are hydrophilic and the presence of the polyalkylene oxide in small quantities in the polymer structure makes the copolymer more hydrophilic than is the homopolymer.

Quite surprisingly, it was discovered that the presence of polyalkylene oxide blocks in the polymer made the attainment of the desired high molecular weight polymers much easier. It is believed that the high molecular weight polymers could be obtained because the copolymer which was formed was more soluble in the polymerization solution and tended therefore to remain in the polymerization solution in the dissolved state rather than as a gel or precipitate thereby permitting the polymerization process to continue for a longer period of time, which confirmed the unacceptably low molecular weight.

EXAMPLES

Example A (KPC-I)

A polycarbonate copolymer identified as KPC-I was prepared by reacting bisphenol A and a polyethylene oxide having a molecular weight of 3,000–3,700 (Union Carbide Carbowax 4000) with phosgene in pyridine solution, according to the process described by Goldberg. Goldberg emphasized polymers containing greater than about 25% polyalkylene oxide, although some polymers having lower polyalkylene oxide content were prepared. The Goldberg polymers were rubberlike and highly hydrophilic—far too hydrophilic for the ultrafiltration and electrophoresis membranes of the present invention. (I have previously reported the preparation of such materials for use as dialysis membranes, J. Macromol Sci. - Chem., A4 (3), pp. 655–664, May 1970; R. E. Kesting, BIOMEDICAL POLYMERS, Part II. A. Rembaum and M. Shen, ed., Marcel Dekker, Inc., New York, 1971, p. 161.)

The KPC-I copolymers herein described are quite different, however, and the emphasis is on low percentages of polyalkylene oxides between 3 and 10, optimally between 4 and 6% and the unique and unexpected properties which result from the combination of low polyalkylene oxide percentages and high molecular weights. The KPC-I copolymers exhibit properties very similar to the polycarbonate homopolymer, except that the copolymers have greater solubility in casting solutions and result in ultrafiltration and electrophoresis membranes whose morphology is very similar to cellulose acetate and cellulose nitrate membranes.

Experimental

A jacketed three liter, 3-necked flask was equipped with a side neck containing a gas addition tube for phosgene, a Teflon (DuPont polytetrafluorethylene) bearing stirrer, a cold finger condenser to condense the unreacted phosgene was used to prepare the KPC-I polymer. 237.5 grams of bisphenol A and 12.5 grams of Carbowax 4000 were dissolved in 190 ml. (2.36 moles) of pyridine, 1100 ml. methylene chloride and the mixture was added to the flask. The flask was maintained at 25°–30°C by circulating tap water through the jacket. Dry ice and acetone were added to the cold finger. Liquid phosgene was added for 1.75 hours until the reaction was finished, as indicated by the condensation of phosgene on the cold finger.

The reaction was stopped by adding isopropyl alcohol to the flask (to cap the ends of the polycabonate and to remove excess phosgene). The viscous, partially precipitated mixture was precipitated with an excess of isopropyl alcohol and collected on a glass frit filter funnel. The polymer was chopped in a Waring blender and washed with isopropyl alcohol until completely free of pyridine and pyridinium hydrochloride. The yield was 264 grams of KPC-I polymer $[\eta]=160$; MW=120,000.

KPC-I was dissolved in a casting solution, as described hereinafter, and excellent quality ultrafiltration and electrophoresis membranes were prepared by the dry phase inversion process described hereinafter.

Example B (KPC-II)

KPC-II polymer was prepared in the same manner as in the preceding example, except that a polyethylene oxide, end-blocked polypropylene oxide, having a molecular weight of about 3,250 with polyethylene oxide blocks mounting to 10% of the toal weight of the copolymer (Wyandotte Pluronic LIOI, described in U.S. Pat. No. 2,674,619), was the alkylene oxide block monomer. Phosgene was added in two stages and a small amount of methylene chloride was added to the reaction solution. The solution was brought to high viscosity in the first stage, diluted with the additional solvent, and then run to completion in the second stage.

Example C (KPC-III)

A series of copolymers in which the polyethylene oxide blocks were completely eliminated was prepared according to the two stage process described in the preceding example except that the polyalkylene oxide was a straight polypropylene oxide. A polymer denominated "KPC-III-(30)" was prepared using a polypropylene oxide block having a molecular weight of 4000, and a polymer denominated KPC-III-(20) was prepared using a polypropylene oxide having a molecular weight of 2000.

Having prepared the KPC-I, KPC-II, and KPC-III polycarbonates and membranes (described subsequently) from these polycarbonates, it was assumed that a unique set of the polycarbonate formulations from which suitable membranes could be manufactured had been discovered, although at that time not all of the features which distinguish the KPC polymers from prior art polymers had not been recognized. It was then known that the prior art polymers were not suitable to produce membranes by the dry process and that the KPC polymers produced highly satisfactoy membranes with very high void volumes, high integrity and strength and possessing unexpectedly desirable properties.

Quite surprisingly, a batch of KPC-I polymer which had once been used to produce suitable membranes produced, instead, a discontinuous patchwork of friable pieces. This was quite disconcerting since at that time there was no known reason why some of these polycarbonates were satisfactory and others were not in the production of high void volume membranes Subsequent examination of this batch of KPC-I polymer indicated that pyridine was present in the polymer and had apparently degraded the KPC-I polycarbonate to lower molecular weight species. The degraded KPC-I polycarbonate had a lower viscosity than the fresh KPC-I polycarbonate.

A comparison of the viscosity of the KPC-I polycarbonate with the viscosity of commercially available polycarbonates, e.g., Lexan, indicated that the degraded KPC-I polycarbonate was of approximately the same molecular weight as the Lexan polycarbonate.

Based upon this after-the-fact reexamination, it was postulated that, in spite of prior art teachings to the contrary, molecular weight was critically important in the formation of membranes by a dry process. This postulate was subsequently tested and it was discovered that there is a minimum molecular weight of about 46,000([η]=75) below which polycarbonates cannot form satisfactory integral high void volume microfiltration, ultrafiltration an electrophoresis membranes by a dry process. The reason why molecular weight is critically important in the formation of polycarbonate high void volume membranes by a dry process and not in other membrane forming processes is believed to be due to the greater probability for intertwining of polymer chains with increasng MW. In all polycarbonate systems tested thus far, it has been found that polycarbonates having molecular weights of less than about 46,000 ([η]=75) cannot be used to form satisfactory high void volume membranes by a dry process.

Dry process solutions are dilute (3–10g of polymer per 100 ml. of solution) relative to wet process solutions which are concentrated (10–30g of polymer per 100 ml. of solution). Because there is much more space between polymer molecules in a dilute solution of the type employed in a dry process, polymer MW has to be very high so that sufficient chain entanglements will occur for integral (i.e., cohesive) membranes to result. Such a membrane, once formed, will have a higher void volume than a membrane prepared from a concentrated solution of the type employed on wet processes.

With this discovery in hand, commercial polycarbonates were reappraised but it was found that no polycarbonates produced within the United States were of sufficiently high molecular weight to permit the formation of high void volume ultrafiltration membranes.

One polycarbonate homopolymer was available from foreign sources which had sufficiently high molecular weight to form high void volume membranes. Such high molecular weight polycarbonate homopolymers are low volume specialty solution casting grades of polycarbonate polymers sold under the Makrolon trade name utilized in the production of dense films.

In addition to bisphenol A and 2,4 tetramethylcyclobutanediol, a large variety of diols may be reacted with phosgent or thiophosgene to form polycarbonate homopolymers and reacted with polyalkylene glycols to form polycarbonate block copolymers. Among the diols which are suitable for forming such polycarbonate are

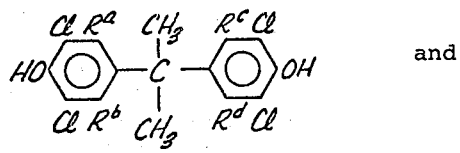

and

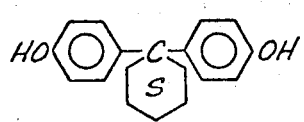

wherein one or more of $R^a$, $R^b$, $R^c$ and $R^d$ may be lower (1-9 carbon) alkyl, aryl or lower (1-a) aralkyl substituents. Among the polyalkylene glycols which are suitable for forming polycarbonate block copolymers are the poly(oxyethylene) glycols sold under the trade name Carbowax by Union Carbide. The Carbowaxes come in 600, 1,000, 4,000, 6,000 and 20,000 molecular weights with very narrow molecular weight distributions. Poly(oxyethyleneoxypropylene) glycols sold under the trade name Pluronic by Wyandotte, made by blocking poly(oxyethylene) chains onto both ends of poly(oxypropylene) backbones are also quite satisfactory. Poly(oxypropylene) glycol sold by Dow Chemical Company as Dow P2000 and poly(oxybutylene) glycol sold as Dow P1000 are also quite satisfactory.

In general polyalkylene glycols having molecular weights in the range of from about 600 to about 20,000 are satisfactory in the formation of polycarbonate block copolymers, the preferred molecular weight range for the polyalkylene glycol block being from about 1,000 to about 4,000.

MEMBRANE FORMATION

Solvents will generally be chosen for their ability to form film-forming casting solutions with the polymer from which the membrane is prepared. A degree of solubility of at least about 4% by weight of the polymer in the solvent is usually required.

Solvent selection can be based upon generally known and accepted criteria, such as the chapters entitled "Solvents and Nonsolvents for Polymers" and "Solubility Parameter Values," POLYMER HANDBOOK, ed. Bradrup and Immergut, John Wiley & Sons, New York, 1966, and from this and other related works generally.

Methylene chloride and methylene chloride-methyl ethyl ketone mixtures are preferred solvents for the polycarbonate polymers and copolymers of this invention when a dry process is employed. Other suitable solvents include dioxane and tetrahydrofuran and bis-dichloroethylene, chloroform and other chlorinated hydrocarbons. Suitable solvents are not, however, limited to those specifically mentioned and solvent selection can be based upon the criteria set forth hereinbefore and known in the art.

Swelling agents (pore makers) which are suitable include mixtures of isopropyl alcohol and resorcinol, trifluoroethanol, hexafluoroisopropanol, cyclohexanol, the hemiacetal resulting from the reaction of hexafluoroacetone and methyl alcohol or maleic acid and, for the BPA polycarbonate homopolymer, resorcinol, etc., without isopropyl alcohol. Other compounds with strong hydrogen bonding capacity and equivalent solubility parameter also function as swelling agents.

Wetting agents suitable for use in the casting solutions include alkylphenoxy poly(ethyleneoxy) ethanol (Igepal DM-710 sold by GAF Corporation), nonyl phenoxy poly(ethyleneoxy) ethanol (GAF Igepal CO-610), octyl phenoxy polyethoxy ethanol (Rohm & Haas Triton X-100) and other nonionic surfactants.

Phase-inversion membranes are solvent-cast structures which owe their porosity to immobilization of the gel prior to complete solvent depletion. Such membranes possess a significantly higher void volume than dense membranes prepared from polymer solutions. This is due to the presence of voids, or vacuoles, which originate in the emulsoid nature of the solutions from which they are formed. Whereas the preparation of dense membranes from polymer solutions entails complete solvent evaporation, solutions which are to result in phase-inversion membranes are not allowed to evaporate to dryness before their structure is set. Instead partial solvent loss is effected so that the initially homogeneous solution separates into two interdispersed liquid phases known as a coacervate at some time prior to the actual transition from sol to gel. The coacervate can be considered as consisting of droplets of one liquid phase embedded in a matrix of the other. Inasmuch as these droplets represent the incipient voids, or vacuoles, within the finished membrane, it is obvious that they must be gelled and the gel stabilized before complete evaporation has led to their disappearance. Because both casting solution and environmental factors can be varied within wide limits to control gel structure, phase inversion represents one of the most versatile processes for the fabrication of semipermeable membranes. Although the preparation of semipermeable membranes by phase inversion has been in progress for more than a century, it was only recently that the sequence of events occurring within the polymer solution was sufficiently well understood to permit a general description of the process with reference to events occurring on the colloidal level both before and after the sol-gel transition. Th prerequisites for the formation of a phase inversion membrane are that (1) the polymer must be soluble in a solvent system consisting of one or more solvents together with other components with lesser affinity for the polymer than a true solvent, and (2) the polymer must have a minimum amount of polarity and hence surface activity. Surface activity helps not only evoke the separation of the solution into two interdispersed liquid phases but also to stabilize the droplets of the dispersed phase once they have formed.

After a polymer solution has been prepared, filtered, and cast with the aid of a doctor blade onto a suitable surface such as glass, it is allowed to desolvate by one of two procedures: complete evaporation (dry process) or partial evaporation (wet process) followed by immersion in a nonsolvent medium.

The complete-evaporation technique exemplifies the manner in which the sol-gel transition is accomplished gradually to produce a gel exhibiting homogeneity in a plane parallel to the surface (if not in depth). Final membrane thickness is only a fraction of the as-cast thickness owing to solvent loss and the resultant increase in the concentration of polymer per unit volume. However, because of the inclusion of voids, it is substantially greater than the thickness of a dense membrane containing an equivalent amount of polymer. The various macroscopically observable stages involved in the formation of membranes by the phase-inversion process are: (1) loss of volatile solvents; (2) gelation; (3) contraction of the gel sometimes accompanied by syneresis; (4) capillary depletion; and (5) loss of residual solvent. Gelation occurs between about 1 and 3 min., during which time most of the volatile true solvent has evaporated. Sometime after gelation, the gel may contract in the process known as syneresis, in which a layer of liquid is exuded so as to cover the nascent membrane. The final step in the formation of the membrane is the evaporation of the residual solvent.

The sequence of events on the colloidal level which corresponds to the five macroscopically observable stages has been deduced from the nature of the gel network in the finished membranes. The polyhedral cell structure is considered to be a somewhat modified and immobilized version of the precursors to the structures which exist in the solution immediately before the transition from sol to gel. An analogy has been drawn between nascent membranes and Pickering emulsions. The latter are three-phase systems consisting of two immiscible liquid phases and a solid phase whose particles are located at the interface represented by the droplets of the dispersed liquid phase. Nascent membranes differ from Pickering emulsions, however, in that in the former all the liquid components of the solution are completely miscible. The appearance of the two interdispersed liquid phases must therefore be at least partially attributable to the presence of the polymer molecules. Inasmuch as only those polymeric species which exhibit some degree of polarity are capable of being fashioned into membranes by the phase-inversion process, it is a reasonable assumption that polarity and the related colloidal property of surface activity are partially responsible for the separation of the polymer solution into two phases and their subsequent stabilization. It need not be assumed, however, that the polymer is solely responsible for the phase inversion. For with the loss of volatile solvent, it appears likely that the less volatile and less strongly solvating components which remain may eventually become incompatible with the solvated polymer species, whose surface activity would then serve to reinforce the already existing tendency to undergo phase separation. The droplets of the dispersed liquid phase need not be present in the initial solution. If the solvent power of the solvent system is sufficient, phase inversion will not be effected until substantial solvent loss has occurred. If, on the other hand, a poor solvent is employed or a substantial amount of swelling agent(s) and/or nonsolvent(s) is present, two phases may be present initially. The ideal casting solution is based upon a fairly strong and volatile solvent, which has the advantage that phase inversion and gelation will not be unduly prolonged and tolerance for other casting solution components will be ample.

As solvent evaporation proceeds, a point is reached at which the decreased solvent power of the remaining substituents permits a spontaneous separation into droplets of one liquid phase interdispersed within a continuous second phase. If the concentration of swelling agent(s) and/or nonsolvent(s) initially present was high, phase separation will occur at an early stage in desolvation so that the droplets of the dispersed phase wll be numerous, small and (because of their large total surface area) covered by a comparatively thin coating of polymer. If the concentration of components other than solvent and polymer is low the solvent power of the solvent system will be correspondingly greater and desolvation will proceed to a greater extent before the droplets of the second liquid phase make their appearance. These droplets will consequently be relatively infrequent, large, and (because of their small total surface area) covered by a comparatively thick coating of polymer. The choice and concentration of swelling agent(s) and/or nonsolvent(s) will determine not only the precise moment of phase inversion but also droplet size and homogeneity. Swelling agents tend to promote decreased droplet size and increased homogeneity, whereas nonsolvents tend to increase droplet size and decrease homogeneity. Combinations of the two have intermediate effects.

In the event that the casting solution contains only polymer and a single solvent, two situations are possible: (1) phase separation may occur owing to poor initial solvent power and the separation of the solvated polymer from the poor solvent (the imbibition of atmospheric moisture can be an additional factor here), or (2) separation into two liquid phases will simply not occur at all prior to gelation.

The entire sequence of events which results in the finished membrane may now be described as follows. The initially homogeneous solution loses solvent and separates into two liquid phases. Most of the polymer molecules distribute themselves about the droplets which have been formed so that relatively few (0.5 percent) are left dispersed in the liquid matrix containing the droplets. The interior of the droplet can be considered as consisting of a liquid with a high concentration of the swelling agent and nonsolvent components of the casting solution. Inasmuch as solvent loss continues after phase inversion, the spherical droplets approach one another eventually making contact in the initial phase of gelation. As the gel network contracts, the droplets deform into polyhedra and the polymer molecules diffuse into the walls of neighboring droplets, causing an intermingling of polymer molecules at the interface. Finally, where the walls are sufficiently thin, e.g. when a high initial concentration of components other than the polymer and solvent causes the formation of numerous small droplets with a large total surface area, contraction causes a tearing of the walls, which then roll up and form the hoselike skeleton of which the gel network is composed. A similar phenomenon occurs during the bursting of soap bubbles and the formation of open-celled foams. It can happen, however, that droplets are covered with such a thick coating of polymer that rupturing of cell walls is somewhat hindered or even entirely inhibited. In such a case either mixed open- and closed-cell or closed-cell structures result. Finally, where no phase inversion occurs, complete desolvation will result in the formation of a dense membrane.

In the complete absence of swelling agent, phase inversion usually does not occur, so that a dense high-resistance membrane is formed. With low concentrations of swelling agent, structures possessing closed cells and exhibiting substantial resistance to material transport are encountered. At intermediate and high concentrations of swelling agent, closed cells are replaced by open cells with a correspondingly lower resistance to transport. A relatively sharp break in the curve of permeability vs. concentration of swelling agent occurs at that concentration at which closed cells give way to open cells.

Increasing the evaporation (drying) time prior to immersion in nonsolvent medium (as in the case of the wet method preparation of reverse-osmosis membranes for desalination) causes a decrease in cell size (as indicated by the decreasing turbidity of the membrane), a decrease in thickness and gravimetric swelling ratio (and hence increase in polymer density), and a decrease in permeability. Permselectivity first increases and then decreases (owing to structural changes in the skin or active layer of the asymmetric membrane).

Although environmental factors involving temperature, relative humidity, drying time, and the gelation bath have substantial effects upon the structure and function of phase-inversion membranes, these are largely second order in comparison with the profound effects which may be wrought by changes in the casting solution itself. The casting solution is composed of the polymer and a solvent system which includes all other components. The various components may be schematically represented as a continuum of species possessing various affinities for the polymeric substance, i.e., a polymer-solvent interaction spectrum.

The implications of this spectrum are of importance to an understanding of dense films and the preparation of phase-inversion membranes by the gradual desolvation of polymer solutions. At one end of the spectrum are the solvents (dispersing agents), which can interact with the polymer molecules to varying extents, thereby influencing both the extent of aggregation and the configuration of the individual macromolecules within the solution. At the opposite end are the non-solvents (precipitants), which are tolerated to a greater or lesser extent by both the dissolved polymer molecules and by the solvent itself. The stronger the nonsolvent, the less will be required to effect the precipitation of polymer from solution. In the middle of the spectrum are the swelling agents (weak precipitants, gelificants). Dense films imbibe swelling agents, thereby increasing their volume; they do not, however, dissolve in them. When nonvolatile swelling agents are present in a solution which is undergoing loss of a more volatile solvent, the strength of the solvent system decreases gradually rather than abruptly, which allows immobilization of the solution by means of homogeneous gelation. The polymer-solvent interaction spectrum should be considered in a dynamic and qualitative sense rather than a static and quantitative one. The position of any species on the spectrum will depend not only on the nature of the polymer (polarity, flexibility, molecular weight, and concentration) but also upon the temperature, its own concentration, and the types and concentrations of the other species present.

Combinations of strong solvents and nonsolvents can function as weak solvents, swelling agents, or nonsolvents, depending upon their relative concentrations. Use of a volatile strong solvent is advisable because of the greater tolerance usually exhibited by such solvents for substantial amounts of swelling agents and nonsolvents. Inclusion of the latter results in additional degrees of freedom with respect to controlling both void volume and pore size. The effects of variations in the casting solution upon the processing and end-use characteristics of phase-inversion membranes are summarized in Table 5.9, *Summary of Effects of Variations in Casting upon Processing and End-use Characteristics of Phase-inversion Membranes*, Kesting, SYNTHETIC POLYMERIC MEMBRANES, supra p. 131, which is incorporated herein by reference. See Chapter 5 of Kesting, SYNTHETIC POLYMERIC MEMBRANES, supra, for a more detailed discussion of Porous Phase-inversion Membranes.

Two means for physically increasing both the strength and the compressive yield point of primary gels have been devised: (1) the incorporation of fibers within the gel network by casting upon a fiber matrix and (2) the incorporation of incompressible particles within the casting solution. However, although such structural supports are effective, they do result in substantial decreases in permeability owing to the greater resistance of the included members compared with the porous gel structure which they displace. Scanning electron photomicrographs of commercially available membranes which have been reinforced by polyamide fibers clearly show the obstruction of normal permeation routes by these fibers. The incorporation of incompressible particles such as silica fillers reduces compressibility but has two disadvantages, viz. lowering the permeability and disrupting the surface layer. This disruption results in decreased permselectivity owing to the wicking action of the protruding filler particles.

Membranes are prepared according to the dry process by dissolving the polymer in the strongest solvent of the solvent system, after which the other components are added. The solution is then filtered and cast onto a suitable substrate, e.g., glass, polished stainless steel, Mylar (DuPont polyester film). The membrane is then dried to completion.

For any concentration of polymer in a given casting solution there is a MW of the polymer above which a skinned membrane will result. By the same token for a given MW polymer there is a concentration above which a skinned membrane will result. If the casting solution solvent system (all of the components but the polymer) is held constant, the critical concentration of polymer below which a matte finish (unskinned) membrane can be produced will decrease with increasing molecular weight. Thus for a given casting solution formulation one can speak of 5g polymers and 6g polymers. A 5g polymer is of higher molecular weight than a 6g polymer because an integral, microporous, membrane can be fabricated from a solution containing only 5g of polymer/formulation whereas 6g of the lower molecular weight polymer/formulation are required to yield an equivalent membrane.

It appears that a certain minimum casting solution viscosity is necessary if an integral membrane is to be formed. Polymer chain entanglements in the incipient gel must be sufficient to ensure integrity, a situation which can be achieved either by increasing polymer MW or by increasing polymer concentration. There are, however, limits beyond which it is not desirable to increase MW or concentration. Upper and lower limits can be assigned to both MW and concentration.

Molecular Weight

The lower limit for MW is the MW below which it is impossible to produce an integral (i.e. continuous defect-free) membrane by the dry process. The upper limit for MW is determined by both the tendency to form a skin and by the tendency to shrink excessively and tear during the drying of the casting solution. For the case of BPA polycarbonate homopolymer the minimum MW = 46,000, $[\eta] = 75$ (no upper limit has been established). For the case of KPC-1 containing 5% carbowax 4000, minimum MW= about 70,000, $[\eta] = 100$ and maximum MW = about 145,000, $[\eta] = 190$.

Below an $[\eta]$ of about 75 (i.e., a MW of about 46,000) it has not been found practicable to produce an integral microporous membrane from either homo- or copolymers by the dry process. Above an $[\eta]$ of about 190 (i.e., a MW of about 145,000) considerable difficulties are also encountered since it is extremely difficult, if not impossible, to obtain a matte finish, and to prevent shrinkage. The matte finish indicates a high pore density, a factor of great importance to ultrafiltration membranes in the 0.05 $\mu$m to 10 $\mu$m range of pore size. Above the optimum molecular weight, excessive shrinkage occurs during drying, leading to both wrinkling and decreased void volume. A skinned membrane is found, but the membrane is not satisfactory for practical use.

Other means for hastening gelation will also aid in the formation of satisfactory membrane, thus increasing the concentrations of nonsolvent(s), swelling agent(s), and surfactant(s) (e.g., water, isopropanol, resorcinol, and Igepal DM-710) will help to form a membrane with a matte finish or with only a thin skin. Such manipulations are only practical within narrow limits, however, owing to the problem of forming incompatible (turbid) solutions which have a tendency to gel spontaneously. This is always a problem because dry process casting solutions are specifically designed to be near the level of incompatibility so that very little solvent loss will be required before phase separation and subsequent gelation occur. For such reasons the acceptable limits of polymer MW and concentration are very meaningful and are not likely to vary significantly from solvent system to solvent system insofar as a completely dry process is concerned. For wet process casting solutions (not the subject this patent), however, considerably lower polymer MW's and higher polymer concentrations are tolerable. It is, however, very difficult if not impossible with a wet process to obtain the extremely high void volumes (up to about 85%) achievable by a dry process. The reason for this is the greater tendency to undergo densification as evaporation proceeds, the higher the concentration of polymer in the casting solution. Other advantages of dry (relative to wet) processes are the greater simplicity and reproducibility of the former.

Concentration

The lower limit for concentration is the level below which integrity cannot be achieved. The upper limit is determined by the tendency to thick skin formation, the tendency for voids to collapse (i.e., membrane densification or loss of void volume), and by the tendency to adhere too strongly to the substrate upon which the solution is cast. The usable polymer concentration range for casting solutions like the above lies between about 3 and 10g, per 100 ml of solution (abbreviated as a "3-10g/formulation") formulation and generally between a 4g and a 8g/formulation (most favorable either 5 or 6g/formulation). To cite some practical examples:

a) KPC-1 copolymer casting solution.
For a casting solution consisting of (Parts by weight)
| | |
|---|---|
| methylene chloride | 92 |
| isopropanol | 21 |
| resorcinol | 10.5 |
| Igepal DM-710 | 1.5 |

6g of KPC-1 polymer containing 5 wt % Carbowax 4000 with an intrinsic viscosity $[\eta]$ of 133-145 (corresponding roughly to a MW of between 95,000 and 105,000) would be required for the formation of an integral unskinned high void volume membrane. For the same casting solution, however, only 5g of a polymer with an $[\eta]$ of 150-167 (corresponding roughly to a MW of between 110,000 and 130,000) would be required.

b) BPA Polycarbonate Homopolymer Casting Solution
| | |
|---|---|
| Homopolymer with MW 46,000; $[\eta] = 75$ | 6 pts |
| methylene chloride | 69 pts |
| methyl ethyl ketone | 14 pts |

```
         resorcinol                              8    pts
         Igepal DM-710                           1.5  pts
   c) BPA-Polyethylene oxide (5% Carbowax 4000) Casting
   Solution
         copolymer [η] 133-167, (MW = 95,000 –
           130,000)                              5-6  pts
         methylene chloride                      92   pts
         hexafluoroisopropanol
            (or trifluoroethanol)                16-20 pts
         isopropanol                             16-20 pts
         Igepal DM-530 (GAF Alkylphenoxy-
            (poly(ethyleneoxy) ethanol)          0.5-1.5 pts
```

In general, a 100 ml formulation will contain from about 4 to about 8 (preferably 5 to 6) grams of polymer or copolymer, from about 40 to about 120 grams of methylene chloride (or about 30 to about 90 ml of other solvents), from about 5 to about 50 grams of a swelling agent, e.g., resorcinol, isopropanol-resorcinol mixtures etc., and from about 0.1 to about 5 grams of an appropriate wetting agents, such as those of the type shown in the examples. Within these general proportions optimum ratios depend on the MW, type and concentration of the polymer or copolymer, solvating power of the solvent and swelling agent, etc., and are best determined, in accordance with the principles setforth herein, on an individual basis for particular system, materials and desired results.

Hexafluoroisopropanol, trifluoroethanol and the hemiacetal formed by the reaction of hexafluoroacetone with methyl alcohol, especially in combination isopropanol, have permitted less complicated production of high void volume membranes according to this invention which have superior qualities, more predictable and reliable characteristics, greater reproducibility and which require less handling and manipulation of process steps and variables than has been possible with other swelling agents or nonsolvents.

The principles, insofar as they are understood, of the present invention have been discussed in some detail. Minimum, maximum and optimum ranges for the variables, insofar as they are known or accurately predicatable from known data, have been given. Specific examples illustrative of the invention have been given. It is intended that these examples, as well as the specific solvents, etc. which are identified, illustrate, and not limit the invention, the scope of the protection sought being limited only by the claims which follow.

What is claimed is:

1. As an article of manufacture, integral, high void volume polycarbonate resin membrane prepared by the dry phase inversion process being composed of polycarbonate polymer or polycarbonate-polyalkylene oxide copolymer having a molecular weight greater than about 46,000 ($\eta = 75$), and having a void volume above 65%.

2. The membranes as defined in claim 1 wherein the molecular weight is in the range of from about 46,000 [$\eta = 75$] to about 145,000 ($\eta = 190$).

3. The membranes as defined in claim 2 wherein the void volume is above 65% and the membrane is unskinned.

4. The membranes as defined in claim 2 wherein the void volume is between about 70% and about 85%.

5. The membranes as defined in claim 2 wherein the molecular weight is in the range of from about 70,000 ($\eta = 100$) to about 145,000 ($\eta = 190$).

6. The membranes as defined in claim 5 wherein the molecular weight is in the optimum range of from about 110,000 ($\eta = 150$) to about 130,000 [$\eta = 175$).

7. The membranes as defined in claim 6 wherein the membranes are unskinned and have a matte finish on both sides.

8. The membranes as defined in claim 6 wherein the void volume is between about 70% and about 85%.

9. The membranes as defined in claim 8 wherein the membranes are unskinned and have a matte finish on both sides.

10. The membranes as defined in claim 5 wherein the void volume is between about 70% and about 85%.

11. The membranes as defined in claim 10 wherein the membranes are unskinned and have a matte finish on both sides.

12. Integral, microporous membranes having a void volume above 50% consisting essentially of polycarbonate resin having the structure

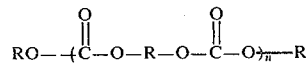

or the structure

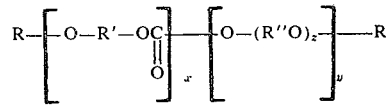

wherein : $n$ is an integer greater than about 180, $x$ is an integer from about 180 to about 600, $y$ is an integer from about 1 to about 6, $z$ is an integer from about 13 to about 450, R is a radical selected from the group consisting of H—, $(CH_3)_2CH$—, and

R' is a radical selected from the group consisting of

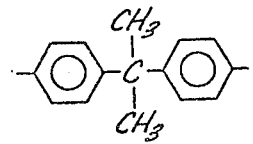

and

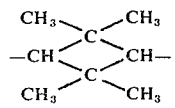

and substituted derivatives thereof, and wherein R'' is a radical selected from the group consisting of

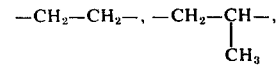

and

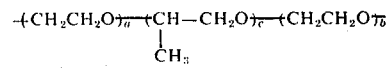

wherein $a$ and $b$ are integers ranging from about 3 to about 10 and $c$ is an integer ranging from about 20 to about 50.

13. The membranes as defined in claim 12 wherein the void volume is above about 65%.

14. The membranes as defined in claim 13 wherein the membranes are unskinned and have a matte finish on both sides.

15. The membranes as defined in claim 13 wherein the void volume is between about 70% and about 85%.

16. The membranes as defined in claim 15 wherein the membranes are unskinned and have a matte finish on both sides.

17. The membranes as defined in claim 12 wherein the molecular weight of the polycarbonate resin is above 46,000 ($\eta = 75$).

18. The membranes as defined in claim 17 wherein the molecular weight of the polycarbonate resin is between about 70,000 ($\eta = 100$) and about 145,000 ($\eta = 190$).

19. The membranes as defined in claim 18 wherein the void volume is above about 65%.

20. The membranes as defined in claim 19 wherein the membranes are unskinned and have a matte finish on both sides.

21. The membranes as defined in claim 19 wherein the molecular weight to the polycarbonate resin is between about 110,000 ($\eta = 150$) and about 130,000 ($\eta = 175$).

22. The membranes as defined in claim 21 wherein the void volume is between about 70% and about 85%.

23. The membranes as defined in claim 22 wherein the membranes are unskinned and have a matte finish on both sides.

* * * * *